H. BÜSSING.
VEHICLE WHEEL RIM.
APPLICATION FILED MAR. 18, 1911.

1,020,797.

Patented Mar. 19, 1912.

Witnesses:

Inventor
Heinrich Büssing

UNITED STATES PATENT OFFICE.

HEINRICH BÜSSING, OF BRUNSWICK, GERMANY.

VEHICLE WHEEL-RIM.

1,020,797.   Specification of Letters Patent.   Patented Mar. 19, 1912.

Application filed March 18, 1911. Serial No. 615,400.

*To all whom it may concern:*

Be it known that I, HEINRICH BÜSSING, owner of a manufactory, a subject of the Duchy of Brunswick, Empire of Germany, residing at 40 Elmstrasse, Brunswick, Germany, have invented certain new and useful Improvements in Vehicle Wheel-Rims, of which the following is a specification.

My invention relates to improvements in vehicle wheel rims in which a pneumatic or other resilient tire is secured to a vehicle wheel in such a way that it can be removed when desired, as in case of injury, and be replaced by a perfect tire.

More specifically, my invention relates to that class of rims which are constructed of two sections one of which can be removed from the felly, so that the elastic tire can be removed from or mounted on the wheel from the side and secured in place by means of a clamping ring and screws. In order to enable the screws to be tightened one or more flat fitting rings have been interposed between the felly and the clamping ring which rings were provided with holes for the screw bolts. For adjusting the pressure of the clamping ring one or more of said flat rings were removed and the nuts screwed down on the bolts. This construction is objectionable, because for removing the said ring or rings and adjusting the pressure of the clamping ring all the screw nuts must be removed from their bolts in case the ring is located on the side of the nuts, while all the bolts must be removed, in case the ring or rings are located on the side of the heads of the bolts.

The object of my improvements is to so construct the said means for securing the rim section in place, that the pressure of the clamping ring on the rim section can be adjusted, without first removing the screw nuts or bolts. With this object in view my invention consists in composing the fitting ring or rings of segmental sections which can be removed in a radial direction after slightly loosening the nuts, while they are securely held in place while the screws are tightened.

In order that my invention may more clearly be understood two examples embodying the same have been shown in the accompanying drawing in which the same letters of reference have been used in all the views to indicate corresponding parts.

Figure 1:
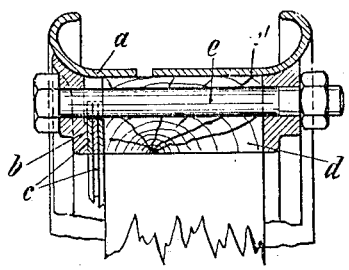
Figure 2:
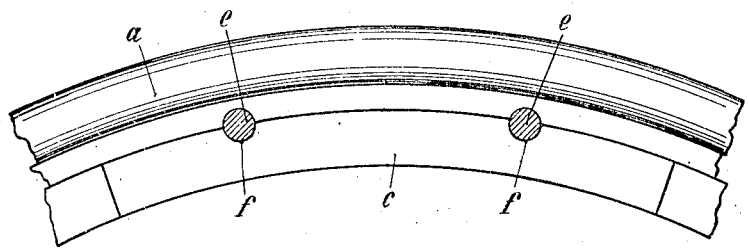

In said drawing Figure 1, is a transverse section through a tire rim and felly. Fig. 2, is a side elevation of a part of the wheel with the screw bolts in section and the clamping ring removed, and showing the form of the fitting plates and their cut-out portions for partly embracing the bolts, Fig. 3, is a detail view showing the said fitting plates, and Fig. 4, is a partial transverse section similar to that shown in Fig. 1 and illustrating a modification of the fitting plates.

Figure 3:
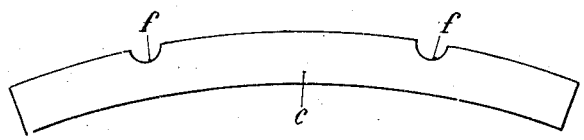
Figure 4:
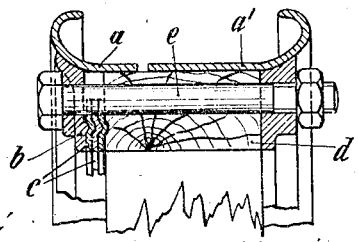

Referring to the example illustrated in Figs. 1 to 3 of the drawing, the tire carrying rim is constructed in two sections $a$ and $a'$. The section $a'$ is secured to the felly $d$ in any preferred way, while the section $a$ can be laterally removed from the felly. Normally the section $a$ is secured in place by means of a clamping ring $b$ and screw bolts $e$ passing through suitable bores of the felly. One or more fitting plates $c$ are interposed between the felly and the ring $b$, which plates are formed with substantially radial ends abutting against one another, and which in their entity form a ring. At their outer margins the said plates bear against the screw bolts $e$, where they are preferably provided with cut-out portions $f$ adapted to partly embrace the said bolts, as is most clearly shown in Fig. 3.

From the construction described it will readily be understood, that the plates are securely held in position, as long as the screw bolts are tightened thereon and the plates are secured within the same plane or planes. They can not be removed radially, because they are locked by their abutting radial ends, and they can not be shifted circumferentially by reason of their friction on the felly and, in the preferred form, by reason of the cut-out portions $f$ embracing the screw bolts. However, if it is desired to adjust the pressure of the ring $b$ the screws $e$ are loosened sufficiently to enable the plates $c$ to be successively displaced in the direction of the axis of the wheel and out of the plane of the other plates, whereupon the said plates can be successively removed in a radial direction. In the preferred form several superposed fitting rings are provided by plates $c$. In order to further increase the reliability of the construction, I prefer to form the plate or plates $c$ with projections adapted to be engaged in corresponding depressions of the felly or the adjacent plates. In cases where several superposed plates $c$ are used, each plate is formed with a depression on one side and a corresponding elevation on the opposite side, as is clearly shown in Fig. 4.

The number of the sectional plates $c$ which form a continuous ring may be equal to the number of the screws, or a single sectional plate may be provided for several bolts, as is shown in Figs. 2 and 3.

To enable the clamping ring $b$ to exert a strong pressure on the sectional rim $a$ the plates $c$ should not be constructed broader than is necessary. Therefore the plates are so arranged as to bear with their circumference against the bolts $e$ or to embrace the same with not more than a semicircle or less.

I claim herein as my invention:

1. In a wheel, the combination with the felly, and a rim made in annular sections, one of which is adapted to be moved from said felly in the direction of the axis of the wheel, of clamping means, screw bolts passing through said felly and clamping means, and fitting plates made in conterminous sections and disposed between said clamping means and felly, the sections of the fitting plates having their outer circumferential edges adjacent the inner sides of said bolts.

2. In a wheel, the combination with the felly, and a rim made in sections one of which is adapted to be removed from said felly in the direction of the axis of the wheel, of clamping means, screw bolts passing through said felly and clamping means, sectional fitting plates disposed between said clamping means and felly the sections of the fitting plates being provided with substantially radial abutting ends and having substantially semi-circular cut-out portions formed in their outer margins and coöperative with the inner sides of said bolts.

3. In a wheel the combination with the felly, and a rim made in annular sections, one of which is adapted to be removed from the felly in the direction of the axis of the wheel, of clamping plates arranged at each side of the felly, screw bolts passing through the felly and the clamping plates and fitting plates interposed between the felly and the clamping plates, the fitting plates being provided with interengaging recesses and projections and being made in sections which have radial abutting ends.

In testimony whereof I have hereunto set my hand in presence of two subscribing witnesses.

HEINRICH BÜSSING.

Witnesses:
 WILHELM LEHRKE,
 WILLI JAHN.